(12) United States Patent
Quintana et al.

(10) Patent No.: US 8,209,792 B1
(45) Date of Patent: Jul. 3, 2012

(54) DUAL-CERAMIC SHUT-OFF VALVE, EXTERNAL TO TANK

(76) Inventors: Richard Quintana, Westminister, CA (US); Kermit L. Achterman, La Canada Flintridge, CA (US); David Millar, Aliso Viejo, CA (US); David Michael Parrish, Westminster, CA (US)

( * ) Notice: Subject to any disclaimer, the term of this patent is extended or adjusted under 35 U.S.C. 154(b) by 0 days.

(21) Appl. No.: 13/087,317

(22) Filed: Apr. 14, 2011

(51) Int. Cl.
*E03D 11/18* (2006.01)
(52) U.S. Cl. ................................ 4/427; 4/420
(58) Field of Classification Search ............... 4/421, 427
See application file for complete search history.

(56) References Cited

U.S. PATENT DOCUMENTS

| | | | |
|---|---|---|---|
| 6,058,519 A | 5/2000 | Quintana |
| 6,367,096 B1 | 4/2002 | Quintana |
| 6,671,893 B1 | 1/2004 | Quintana et al. |
| 6,877,170 B1 | 4/2005 | Quintana et al. |
| 6,934,977 B1 | 8/2005 | Quintana et al. |
| 7,000,627 B1 | 2/2006 | Johnson |

*Primary Examiner* — Gregory Huson
*Assistant Examiner* — Karen L Younkins
(74) *Attorney, Agent, or Firm* — QuickPatents, Inc.; Kevin Prince

(57) ABSTRACT

A shut-off valve for connecting between a water supply valve and a tank inlet port of a toilet tank includes a housing having an inlet port, an outlet port, a valve mechanism, a trip mechanism, and a trip circuit electrically connected with the trip mechanism. The valve mechanism includes a valve housing rotationally confining a first ceramic disk and a ceramic second disk, each disk having at least one aperture therethrough that, when mutually aligned, allow for fluid communication between the inlet and outlet ports. The trip mechanism includes a rotational spring that urges rotation of an axial shaft fixed coaxially with the second disk. A trip latch is adapted to prevent rotation of the axial shaft and second disk except when withdrawn from the axial shaft by a solenoid electrically connected to the trip circuit that is electrically connected with a toilet tank overflow sensor, a toilet bowl overflow sensor, or the like. Upon detection of a fault condition, the trip circuit trips the trip mechanism to prevent water from flowing into the toilet tank until the fault can be corrected, thereby conserving water and often preventing water damage.

13 Claims, 5 Drawing Sheets

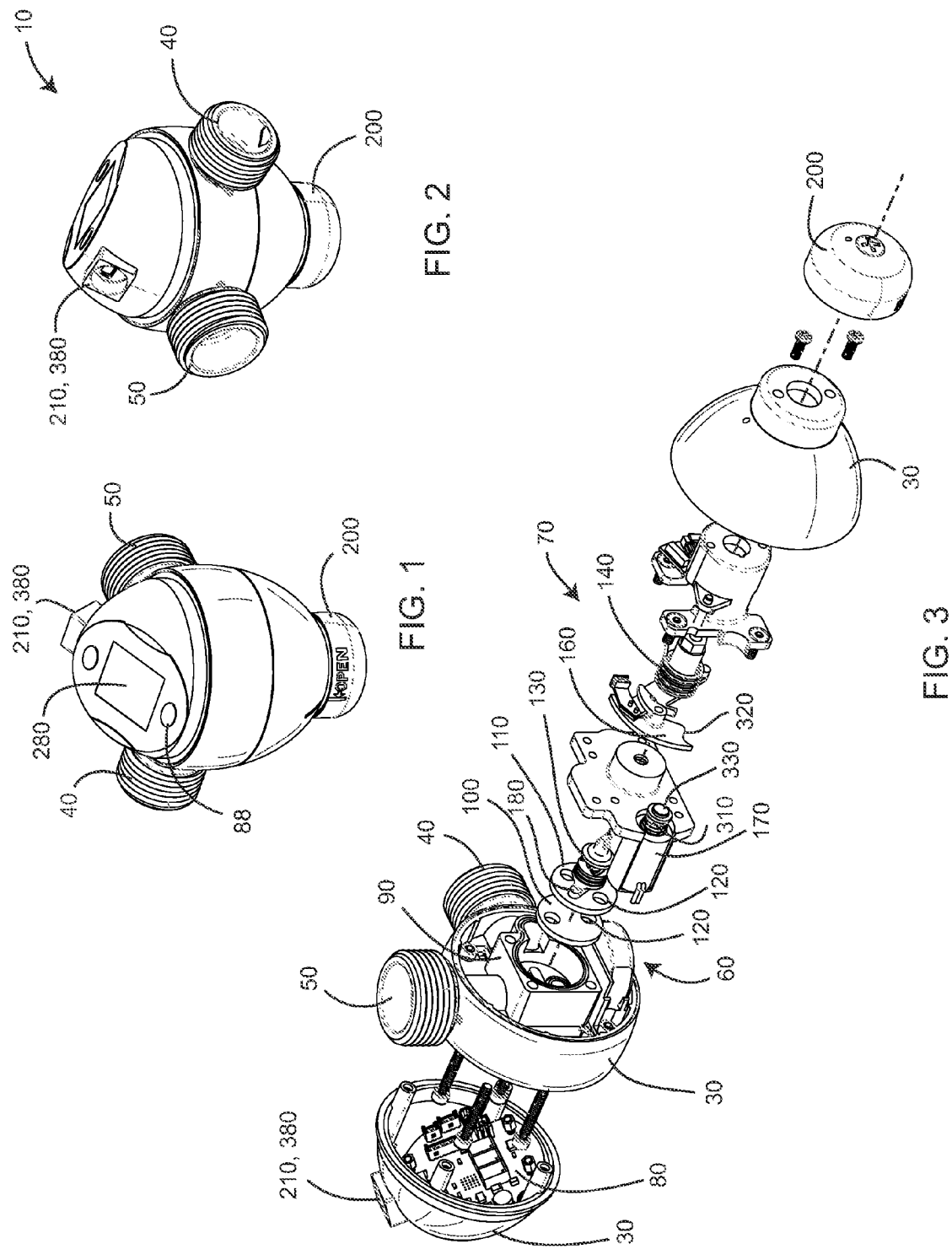

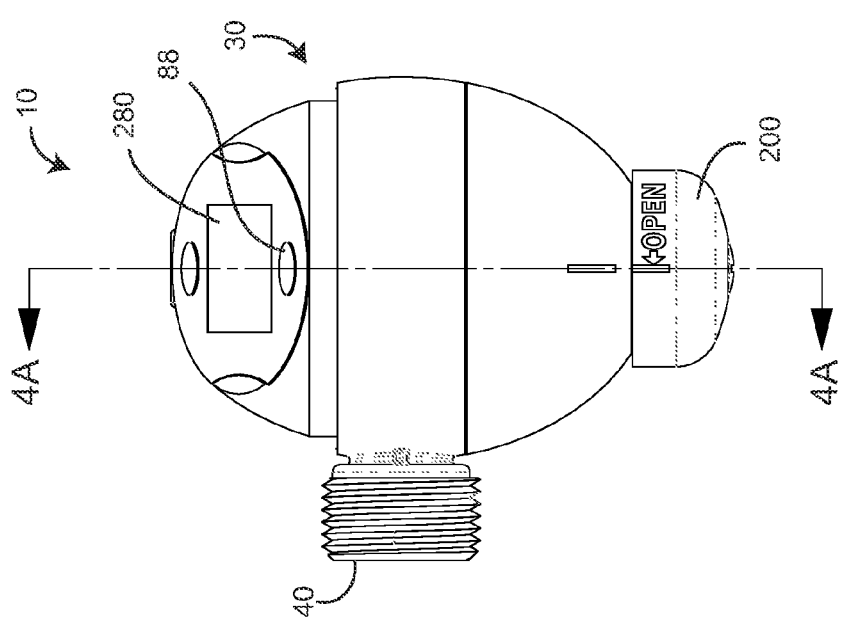
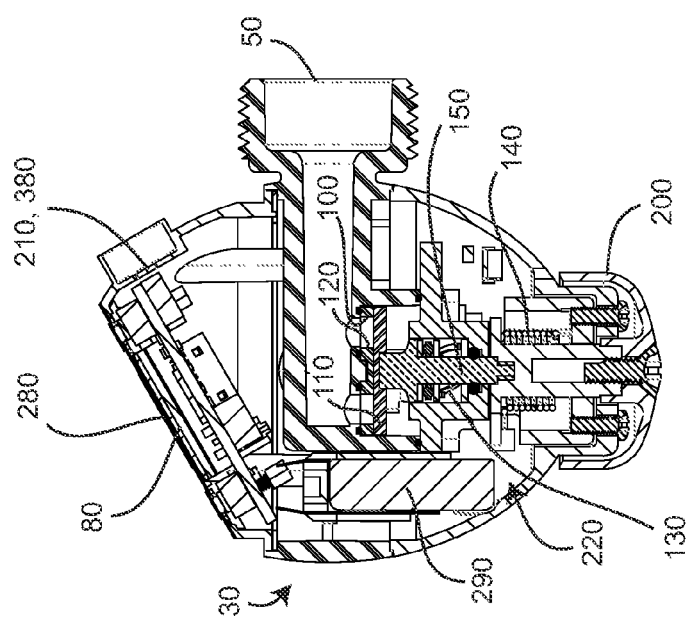
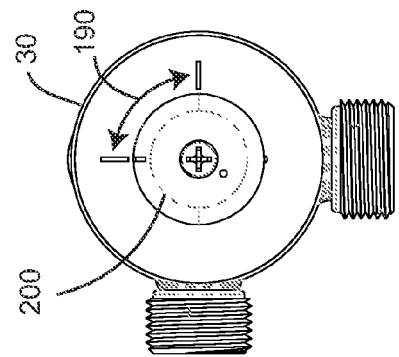
FIG. 4
FIG. 4A
FIG. 6

DUAL-CERAMIC SHUT-OFF VALVE, EXTERNAL TO TANK

STATEMENT REGARDING FEDERALLY SPONSORED RESEARCH AND DEVELOPMENT

Not Applicable.

FIELD OF THE INVENTION

This invention relates to valves, and more particularly to an automated shut-off valve.

DISCUSSION OF RELATED ART

Flush toilets are well known in the art. Traditionally, a flush toilet comprises a water reservoir, a release lever, a valve, a float, and a bowl. The release lever is attached to the valve at the bottom of the reservoir. By depressing the release lever, the valve opens and releases water to the bowl, which carries waste to a different location. The reservoir is connected to a water line, which fills the reservoir to a specific level designated by the float.

Flush toilets, as with all mechanical devices, need regular maintenance and repair when the internal parts fail. While a properly maintained toilet will only use water when inventions that disable the flow of water automatically, but none that are equivalent to the present invention.

U.S. Pat. No. 6,058,518 to Quintana on May 9, 2000, also teaches a device to automatically disable the flow of water in a toilet. This device uses a sensor mounted on the rim of a toilet bowl to close a circuit to a solenoid that disables the flow of water. This device, however, does not include a sensor inside of the reservoir to detect water flow. This device also uses a traditional high energy solenoid valve system for disabling the flow of water. Lastly, this device cannot provide statistics to the user to reduce the amount of water that is used by the toilet.

U.S. Pat. No. 6,367,096 to Quintana on Apr. 9, 2002, also teaches a device to automatically disable the flow of water in a toilet. This device uses a water level sensor mounted on the reservoir of a toilet and a water level sensor mounted on the bowl of a toilet to activate a motor controlled valve. This device does not use an improved low-energy solenoid valve to disable the flow of water. Furthermore, this device cannot provide statistics to the user to reduce the amount of water that is used by the toilet.

U.S. Pat. No. 6,671,893 to Quintana on Jan. 6, 2004, also teaches a device to automatically disable the flow of water in a toilet. This device uses a water flow sensor to disable the flow of water to a toilet. This device does not use an improved low-energy solenoid valve to disable the flow of water, and does not include sensors on the bowl and reservoir.

U.S. Pat. No. 6,877,170 to Quintana et al. on Apr. 12, 2005, also teaches a device to automatically disable the flow of water in a toilet. This device uses a mechanism that is placed inside of the reservoir itself. This device is distinguishable from the present invention in that it is entirely enclosed under water inside the reservoir and does not disable water flow directly from the water line.

U.S. Pat. No. 6,934,977 to Quintana et al. on Aug. 30, 2005, also teaches a device to automatically disable the flow of water in a toilet. This device uses a mechanism that is placed inside of the reservoir itself. This device is distinguishable from the present invention in that it moves up and down relative to the water level of the reservoir and does not disable water flow directly from the water line.

U.S. Pat. No. 7,000,627 to Johnson on Feb. 21, 2006, also teaches a device to automatically disable the flow of water in a toilet. This device uses a timer and sensor inside the reservoir to determine if the toilet is functioning properly. This device is distinguishable from the present invention in that it rests inside of the reservoir, uses a timer, does not disable water flow directly from the water line, and does not use an improved low-energy solenoid valve system to disable the water flow.

Therefore, a need exists for a device that can automatically disable the flow of water from the water line to a toilet whenever a fault condition is found using an advanced, low energy solenoid valve system that manipulates ceramic discs to control the flow of water. Further, the needed device would provide usage statistics to reduce the amount of water that is used by the toilet. The present invention accomplishes these objectives.

SUMMARY OF THE INVENTION

The present device is a shut-off valve for connecting between a water supply valve and a tank inlet port of a toilet tank. A housing contains an inlet port adapted for fluid connection with the water supply valve, and an outlet port is adapted for fluid connection with the tank inlet port. The housing further contains a valve mechanism, a trip mechanism, and a trip circuit electrically connected with the trip mechanism.

The valve mechanism includes a valve housing rotationally confining a first ceramic disk and a ceramic second disk, each disk having at least one aperture therethrough. A compression spring holds the second disk coaxially against the first disk. Only when the apertures in each disk are mutually aligned, fluid communication between the inlet and outlet ports may occur.

The trip mechanism includes a rotational spring that urges rotation of an axial shaft fixed coaxially with the second disk. A trip latch is adapted to prevent rotation of the axial shaft and second disk except when withdrawn from the axial shaft by a solenoid electrically connected to the trip circuit. A reset knob is fixed with the rotational spring and axial shaft to reset the trip latch.

The trip circuit includes at least one trip sensor input and a power source. At least one trip sensor is selectively electrically connected to the trip sensor input. Such a trip sensor may be a toilet tank overflow sensor, a toilet bowl overflow sensor, or the like.

In use, when the trip circuit detects a fault condition on any of the at least one trip sensors, the trip circuit connects power to the solenoid to withdraw the trip latch from the axial shaft, the rotational spring then rotating the second disk such that the apertures of each disk become misaligned to fluidly isolate the inlet and outlet ports from each other. After the fault has been corrected, the reset knob may be rotated outside of the toilet tank to reset the tension in the rotational spring and rotate the second disk such that the at least one aperture of each disk become co-aligned to allow fluid communication between the inlet and outlet ports.

Fault conditions that may be detected with either the toilet tank overflow sensor or the toilet bowl overflow sensor may include: a) a toilet bowl overflow due to an occluded toilet drain, in which case the toilet bowl overflow sensor detects a water level in the toilet bowl above a preset water line height; b) a flapper valve stuck in an open position, in which case water leaves the toilet tank but fails to return to a preset water line height within a predetermined period of time; c) a faulty fill valve that fails to shut-off, wherein the toilet tank overflow sensor detects water rising above the water line height; and d) a leaky flapper valve, wherein the toilet tank overflow sensor detects water regularly falling below the water line height and then quickly thereafter rising to the water line height, the cycle repeating continuously. Upon all such fault conditions, the trip circuit may trip the trip mechanism to prevent water from flowing into the toilet tank until the fault can be corrected, thereby conserving water and often preventing water damage.

The present invention automatically disables the flow of water from the water line to a toilet whenever a fault condition is found using an advanced, low energy solenoid valve system that manipulates ceramic discs to control the flow of water. Further, present invention provides usage statistics to reduce the amount of water that is used by the toilet. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a front perspective view of the invention;
FIG. 2 is a rear perspective view of the invention;
FIG. 3 is an exploded perspective view of the invention, illustrating first and second ceramic disks;
FIG. 4 is a front elevational view of the invention;
FIG. 4A is a cross-sectional view of the invention, taken across lines 4A-4A of FIG. 4;
FIG. 6 is a bottom plan view of the invention.

DETAILED DESCRIPTION OF THE PREFERRED EMBODIMENT

Figure 7:
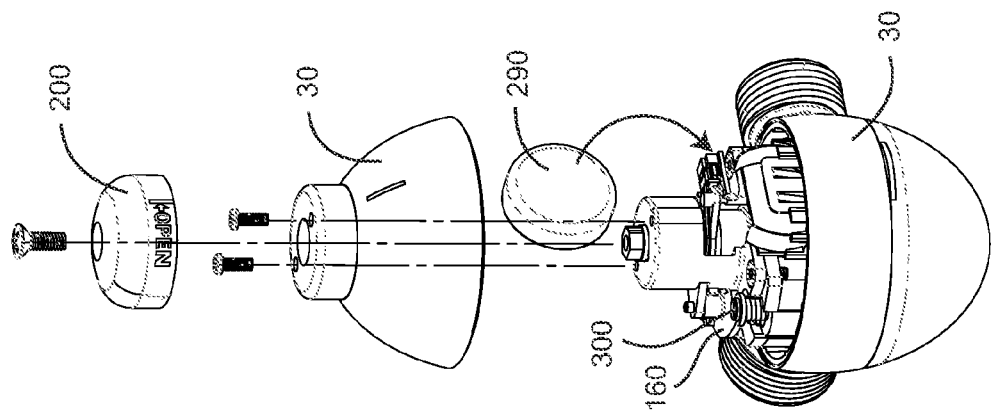
FIG. 7 is a partially exploded bottom perspective view of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

FIGS. 1, 3, 4 and 8 illustrate a shut-off valve 10 for connecting between a water supply valve 15 and a tank inlet port 25 of a toilet tank 20. A housing 30 contains an inlet port 40 adapted for fluid connection with the water supply valve 15, and an outlet port 50 is adapted for fluid connection with the tank inlet port 25. The housing 30 is preferably made from a rigid injection-molded plastic material, and is substantially water resistant such that water contacting the enclosure 30 is not able to penetrate the housing 30.

The housing 30 further contains a valve mechanism 60, a trip mechanism 70, and a trip circuit 80 electrically connected with the trip mechanism 70. The valve mechanism 60 includes a valve housing 90 rotationally confining a first disk 100 and a second disk 110, each disk having at least one aperture 120 therethrough. The first and second disks 100,110 are preferably made from a polished ceramic material, or the like. A compression spring 130 holds the second disk 110 coaxially against the first disk 100. The at least one aperture 120 in each disk 100,110 when mutually aligned allows fluid communication between the inlet and outlet ports 40,50. When the apertures 120 of each disk 100,110 are misaligned, fluid flow between the inlet and outlet ports 30,40 is prevented.

Figure 5A:
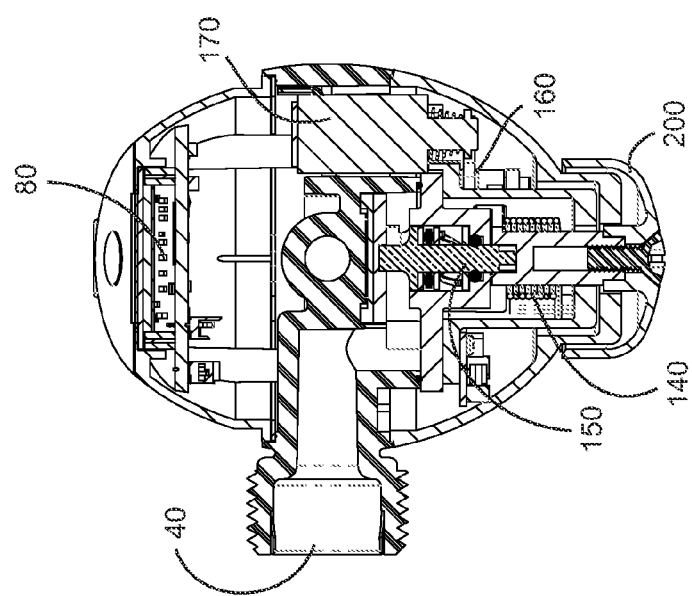
FIG. 5A is a cross-sectional view of the invention, taken across lines 5A-5A of FIG. 5.

The trip mechanism 70 includes a rotational spring 140 that urges rotation of an axial shaft 150 fixed coaxially with the second disk 110. A trip latch 160 is adapted to prevent rotation of the axial shaft 150 and second disk 110 except when withdrawn from the axial shaft 150 by a solenoid 170 electrically connected to the trip circuit 80 (FIGS. 3 and 5A). A stop 180 (FIG. 3) prevents over-rotation of the second disk 110 beyond a preset rotational point 190 (FIG. 6), and a reset knob 200 (FIGS. 2-4) is fixed with the rotational spring 140 and axial shaft 150 to reset the trip latch 160.

Figure 12:
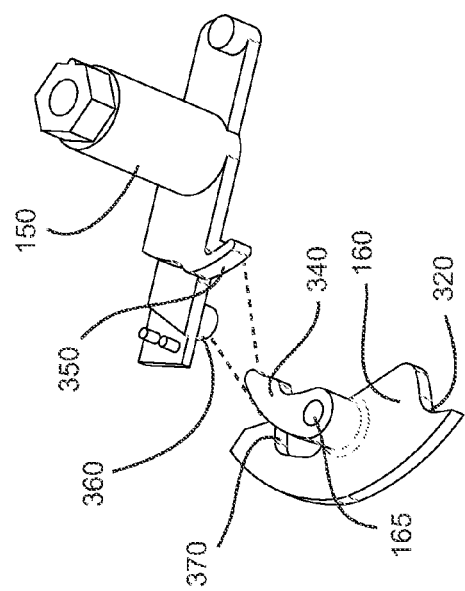
FIG. 12 is a perspective view of one embodiment of a trip latch and an axial shaft of the invention.

In one embodiment, the trip latch 160 includes a raised disk 300 at the end of a solenoid actuator 310 (FIGS. 3 and 12) that is urged into a notch 320 of the trip latch 160 by a coil spring 330. The trip latch 160 prevents rotation of the axial shaft 150 until withdrawal of the raised disk 300 of the solenoid actuator 310 from the notch 320 of the trip latch 160. Because the rotational spring 140 applies lateral pressure to the solenoid actuator 310 sufficient to inhibit the withdrawal of the raised disk 300 from the notch 320, the trip latch 160 preferably includes the notch 320 on one side of a pivot 165 and a second notch 27 on an opposing side thereof (FIG. 12). The axial shaft 150, in such an embodiment, arm 340 of the trip latch 160 when the axial shaft 150 is reset with the reset knob 200 so as to rotate the trip latch 160 so that the peg 360 engages the second notch 370. As such, lateral pressure of the rotational spring 140 through the trip latch 160 is relieved or balanced between the peg 360 and the raised disk 300 of the actuator 310. As such, a relatively smaller solenoid 170 is needed, requiring less power from the battery 290, to retract the raised disk 300 from the notch 320 to trip the trip mechanism 70.

Figure 5:
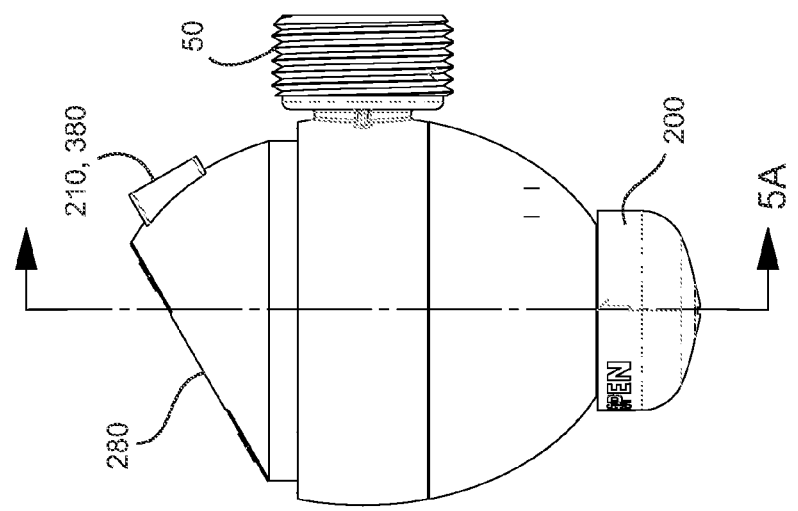
FIG. 5 is a left-side elevational view of the invention.
Figure 9:
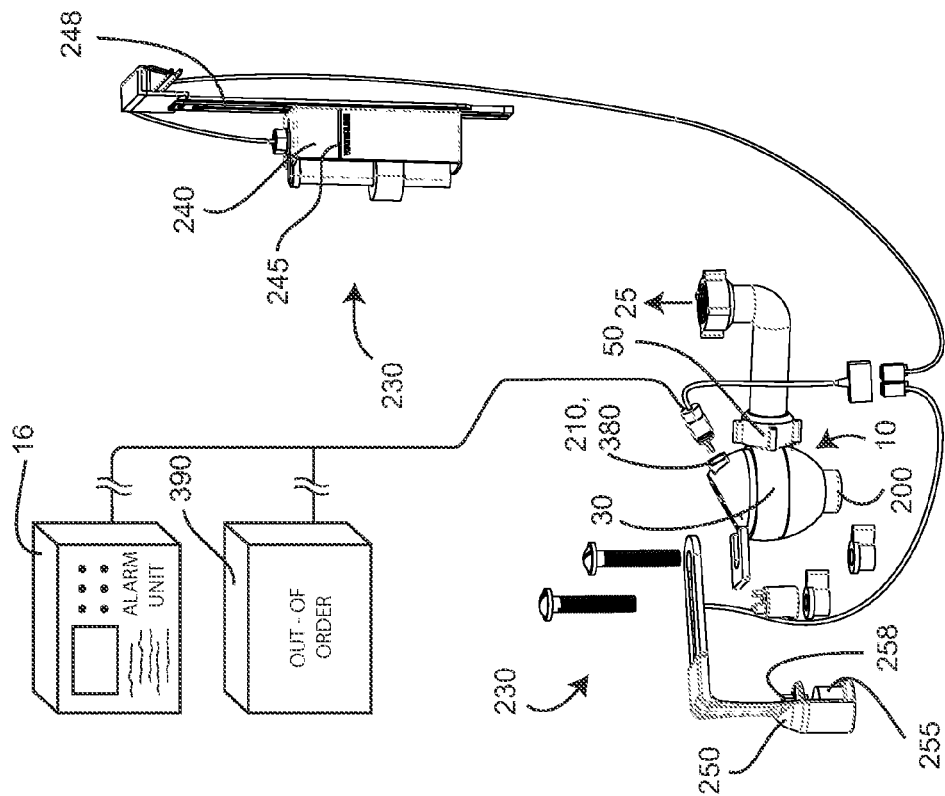
FIG. 9 is an exploded perspective view of the invention showing two trip sensors as deployed on a toilet, the toilet omitted for clarity of illustration.
Figure 8:
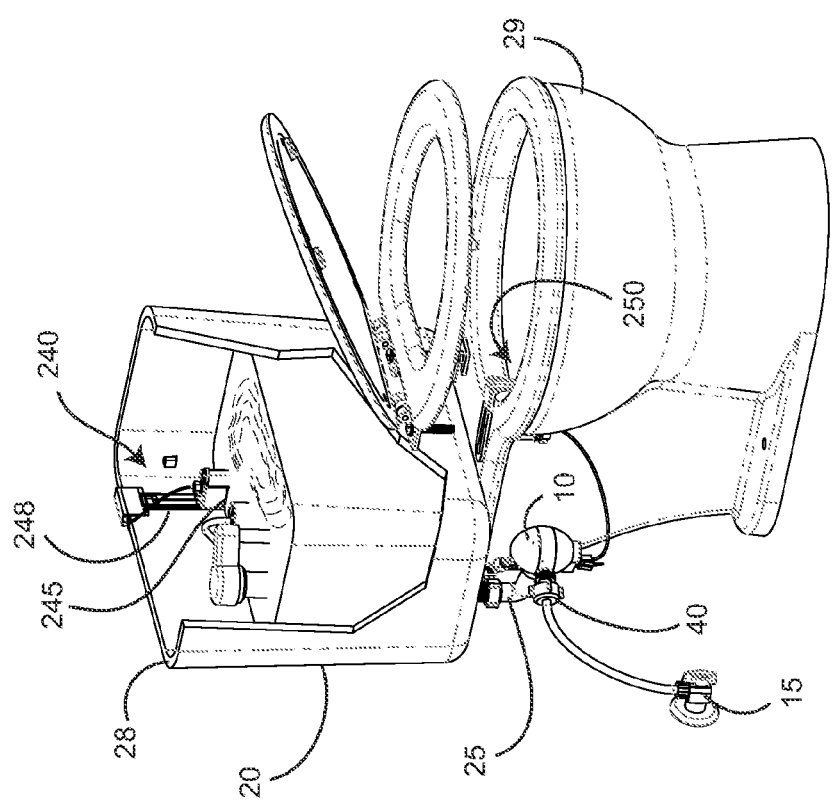
FIG. 8 is a partially exploded perspective view of the invention as installed on a toilet, a toilet tank of the toilet partially broken away.
Figure 11:
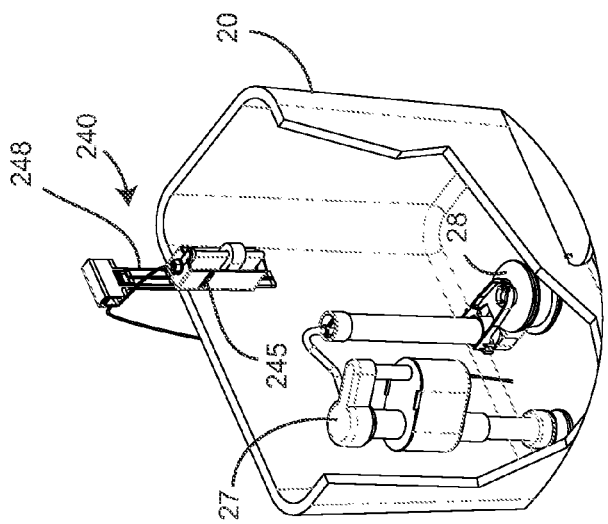
FIG. 11 is a perspective partially cut-away view of a toilet tank and a toilet tank overflow sensor.
Figure 10:
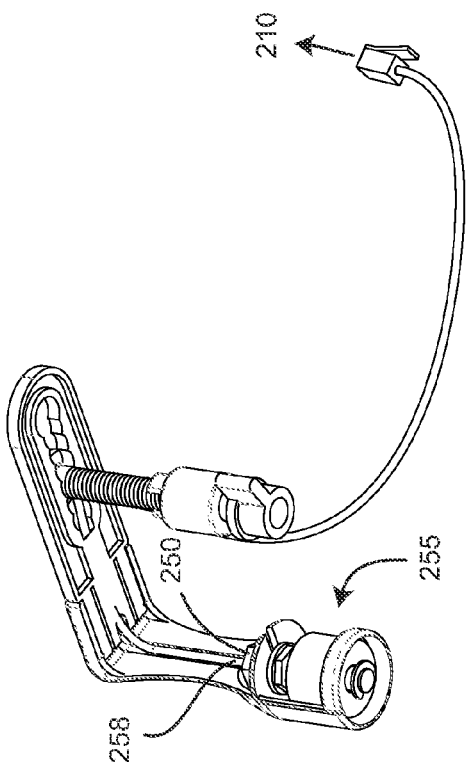
FIG. 10 is a bottom perspective view of a toilet bowl overflow sensor of the invention.

The trip circuit 80 includes at least one trip sensor input 210 (FIGS. 2 and 5) and a power source 220, such as a battery 290 (FIGS. 4A and 7) electrically connected to the trip circuit 80, or an A/C adapter (not shown), or the like. At least one trip sensor 230 (FIGS. 8-11) is included and adapted to sense a fault condition. Each trip sensor 230 is selectively electrically connected to the trip sensor input 210.

Such a trip sensor 230 may be a toilet tank overflow sensor 240 selectively mounted around the top rim 28 of the toilet tank 20, for example. Such a tank overflow sensor 240 includes an overflow height adjustment 248 for selecting a proper water line height 245 within the toilet tank 20. The tank overflow sensor 240 is adapted to detect when water has drained from the toilet tank 20, returned to the water line height 245, and if the water exceeds the water line height 245 whereupon the tank overflow sensor 240 reports a fault condition to the trip circuit 80.

Another of the trip sensors 230 may be a toilet bowl overflow sensor 250 that is adjustment 258 for selecting a water line height 255 within the toilet bowl 29. If water in the toilet bowl 29 rises above the water line height 255 then the toilet bowl overflow sensor 250 reports a fault condition to the trip circuit 80.

In one embodiment, the trip circuit 80 further includes an audible alert transducer 270 for periodically producing an audible alert of the detection of a fault condition and a closed valve mechanism 60. A visual display 280 may be further included for providing information concerning the operation of the shut-off valve 10, such as detection of a fault condition, the open or closed status of the valve mechanism 60, power remaining in the battery 290, estimated time until next battery 290 change, statistics concerning the number of flushes over a selected period of time, estimated water use rates, and the like.

In one embodiment, the trip circuit 80 further includes an alarm output 380, whereby upon detection of a fault condition an alarm signal may be conveyed to an external alarm unit, such as a home or commercial security system, an out-of-order indicator 390 (FIG. 9), or the like. Such an alarm output 380 may share the same connector as the trip sensor input 210, as shown in the figures, or may include a separate connector (not shown). The trip circuit 80 may include a user interface 88 that allows for selection of an operating mode of the trip circuit 80 wherein upon detection of a fault condition, the trip circuit 80 trips the trip mechanism 70 and conveys the alarm signal through the alarm output 380, or trips the trip mechanism 70 without conveying the alarm signal, or conveys the alarm signal to the alarm output 380 without tripping the trip mechanism 70.

In use, when the trip circuit 80 detects a fault condition on any of the at least one trip sensors 230, the trip circuit 80 connects power to the solenoid 170 to withdraw the trip latch 160 from the axial shaft 150, the rotational spring 140 then rotating the second disk 110 such that the apertures 120 of each disk 100,110 become misaligned to fluidly isolate the inlet and outlet ports 40,50 from each other. After the fault has been corrected, the reset knob 200 may be rotated outside of the toilet tank 20 to reset the tension in the rotational spring 140 and rotate the second disk 110 such that the at least one aperture 120 of each disk 100,110 become co-aligned to allow fluid communication between the inlet and outlet ports 40,50.

Fault conditions that may be detected with the toilet tank overflow sensor 240 and the toilet bowl overflow sensor 250 may include: a) a toilet bowl overflow due to an occluded toilet drain, in which case the toilet bowl overflow sensor 250 detects a water level in the toilet bowl 29 above the water line height 255; b) a flapper valve 28 (FIG. 11) stuck in an open position (not shown), in which case water leaves the toilet tank 20 but fails to return to the water line height 245 within a predetermined period of time; c) a faulty fill valve 27 (FIG. 11) that fails to shut-off, wherein the toilet tank overflow sensor 240 detects water rising above the water line height 245; and d) a leaky flapper valve 28, wherein the toilet tank overflow sensor 240 detects water regularly falling below the water line height 245 and then quickly thereafter rising to the water line height 245, the cycle repeating continuously. Upon all such fault conditions, the trip circuit 80 may trip the trip mechanism 70 to prevent water from flowing into the toilet tank 20 until the fault can be corrected, thereby conserving water and often prevention water damage.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A shut-off valve for connecting between a water supply valve and a tank inlet port of a toilet tank, comprising:
   a housing containing an inlet port adapted for fluid connection with the water supply valve, an outlet port adapted for fluid connection with the tank inlet port, a valve mechanism, a trip mechanism, and a trip circuit electrically connected with the trip mechanism;

the valve mechanism including a valve housing rotationally confining a first disk and a second disk, each disk having at least one aperture therethrough, a compression spring holding the second disk coaxially against the first disk, the at least one aperture in each disk when aligned allowing fluid communication between the inlet and outlet ports;

the trip mechanism including a rotational spring urging rotation of an axial shaft fixed coaxially with the second disk, a trip latch adapted to prevent rotation of the axial shaft and second disk except when withdrawn from the axial shaft by a solenoid electrically connected to the trip circuit, a stop to prevent rotation of the second disk beyond a preset rotational point, and a reset knob fixed with the rotational spring and axial shaft;

the trip circuit including at least one trip sensor input and a power source; and at least one trip sensor adapted to sense a fault condition, each trip sensor selectively electrically connected to the trip sensor input;

whereby when the trip circuit detects a fault condition on any of the at least one trip sensors, the trip circuit connects power to the solenoid to withdraw the trip latch from the axial shaft, the rotational spring rotating the second disk such that the apertures of each disk become misaligned, thereby fluidly isolating the inlet and outlet ports, the reset knob being rotatable outside of the toilet tank to reset tension in the rotational spring and rotate the second disk such that the at least one aperture of each disk become co-aligned.

2. The shut-off valve of claim 1 wherein one of the at least one trip sensor is a toilet tank overflow sensor.

3. The shut-off valve of claim 2 wherein the toilet tank overflow sensor is selectively fixable about a top rim of a toilet tank and includes an overflow height adjustment for selecting a water line height within the toilet tank above which the toilet tank overflow sensor reports a fault condition to the trip circuit.

4. The shut-off valve of claim 1 wherein one of the at least one trip sensors is a toilet bowl overflow sensor.

5. The shut-off valve of claim 4 the toilet bowl overflow sensor is selectively fixable with a toilet bowl and includes an overflow height adjustment for selecting a water line height within the toilet bowl above which the toilet bowl overflow sensor reports a fault condition to the trip circuit.

6. The shut-off valve of claim 1 wherein the trip circuit further includes an audible alert transducer for periodically producing an audible alert of the detection of a fault condition and a closed valve mechanism.

7. The shut-off valve of claim 1 wherein the trip circuit further includes a visual display for providing information concerning the operation of the shut-off valve, detection of a fault condition, and a closed valve mechanism.

8. The shut-off valve of claim 1 wherein the power source is a battery contained within the housing and electrically connected to the trip circuit.

9. The shut-off valve of claim 1 wherein the trip latch includes a raised disk at the end of a solenoid actuator that is urged into a notch of the trip latch by a coil spring, the trip latch preventing rotation of the axial shaft until withdrawal of the raised disk of the solenoid actuator from the notch of the trip latch.

10. The shut-off valve of claim 1 wherein the trip latch is pivotally fixed to the housing such that the rotational spring of the trip mechanism does not cause the trip latch to impart significant lateral force to the raised disk of the solenoid actuator, thereby facilitating the withdrawal of the raised disk from the trip latch by the solenoid.

11. The shutoff valve of claim 1 wherein the trip circuit further includes an alarm output, whereby upon detection of a fault condition an alarm signal may be conveyed to an external alarm unit.

12. The shutoff valve of claim 11 wherein the trip circuit may include operating modes wherein upon detection of a fault condition, the trip circuit may either trip the trip mechanism and convey the alarm signal through the alarm output, or trip the trip mechanism without conveying the alarm signal, or convey the alarm signal without tripping the trip mechanism.

13. The shutoff valve of claim 11 wherein the alarm signal may be conveyed to an out-of-order indicator for display near the toilet, whereby upon detection of the alarm signal the out-of-order indicator is activated.

\* \* \* \* \*